United States Patent
Ein-Eli et al.

[11] Patent Number: 5,986,879
[45] Date of Patent: Nov. 16, 1999

[54] ASYMMETRIC ORGANIC ALKYL ETHYL CARBONATES FOR NON-AQUEOUS POWER SOURCES

[75] Inventors: Yair Ein-Eli, Waltham; Richard Laura, Melrose, both of Mass.

[73] Assignee: Covalent Associates, Woburn, Mass.

[21] Appl. No.: 09/001,683

[22] Filed: Dec. 31, 1997

[51] Int. Cl.⁶ .................................................. H01G 9/02
[52] U.S. Cl. ......................... 361/525; 361/527; 252/62.2
[58] Field of Search .................... 361/505, 502, 361/541, 503, 504, 508, 523, 525, 527, 528; 429/224; 425/50; 252/62.2

[56] References Cited

U.S. PATENT DOCUMENTS

| 4,189,761 | 2/1980 | Finkelstein et al. | 361/505 |
| 5,474,862 | 12/1995 | Okuno et al. | |
| 5,521,027 | 5/1996 | Okuno et al. | 429/194 |
| 5,552,238 | 9/1996 | Carlin et al. | 429/50 |
| 5,571,635 | 11/1996 | Shu et al. | 429/194 |
| 5,869,208 | 2/1999 | Miyasaka | 429/224 |

FOREIGN PATENT DOCUMENTS

| 714148 A1 | 5/1996 | European Pat. Off. |
| 757399 A1 | 2/1997 | European Pat. Off. |
| 07249432 A2 | 9/1995 | Japan |
| 07296848 A2 | 11/1995 | Japan |
| 07326385 A2 | 12/1995 | Japan |
| 08007923 A2 | 1/1996 | Japan |
| 08045544 A2 | 2/1996 | Japan |
| 08078052 A2 | 3/1996 | Japan |
| 08115742 A2 | 5/1996 | Japan |
| 08138733 A2 | 5/1996 | Japan |
| 08171934 A2 | 7/1996 | Japan |
| 08293324 A2 | 11/1996 | Japan |
| 08298134 A2 | 11/1996 | Japan |
| 08306364 | 11/1996 | Japan |
| 8-306387 A2 | 11/1996 | Japan |
| WO 9641801 | 12/1996 | WIPO |

*Primary Examiner*—Dean A. Reichard
*Assistant Examiner*—Anthony Dinkins
*Attorney, Agent, or Firm*—Weingarten, Schurgin, Gagnebin & Hayes LLP

[57] ABSTRACT

Acyclic, asymmetric ethyl alkyl carbonates, particularly for use with a carbonaceous, e.g., graphite, anode, in electrolytes suitable for portable power sources, are disclosed. Asymmetric alkyl carbonates having the general structural formula $EtO-CO_2R$, where R is larger than ethyl, and most preferably equal to butyl, iso-butyl or sec-butyl, are particularly useful in causing the freezing point of the electrolytes in which they are used to decrease dramatically, thus providing the key to low temperature, high cycle life and high capacity for portable power sources.

14 Claims, 4 Drawing Sheets

ASYMMETRIC ORGANIC ALKYL ETHYL CARBONATES FOR NON-AQUEOUS POWER SOURCES

STATEMENT REGARDING FEDERALLY SPONSORED RESEARCH OR DEVELOPMENT

Part of the work leading to this invention was carried out with United States government support provided under National Institutes of Health Grant Number 1 R43 HL57679-01. Therefore, the U.S. government has certain rights in this invention.

BACKGROUND OF THE INVENTION

1. Field of the Invention

The present invention relates to a high energy, non-aqueous portable power source such as a high energy density battery or high power electrochemical capacitor, and more particularly, to a high energy, non-aqueous portable power source comprising novel asymmetric alkyl carbonate-based electrolytes which afford improved cycle life, high capacity, and superior low temperature performance.

2. Description of the Prior Art

Non-aqueous electrolytes formulated specifically for application in electrochemical devices optimally possess a variety of desirable qualities, as described in a recent review article by Gores, et al.(1). The authors cite low temperature performance and electrochemical stability as two key requirements for both non-aqueous batteries and capacitors, but do not teach how these requirements may be achieved.

U.S. Pat. No. 5,525,443 (2) discloses a non-aqueous rechargeable lithium ion battery comprising a complex oxide containing lithium, a carbonaceous anode material, and a mixed solvent electrolyte consisting of a lithium salt and a binary blend of a cyclic and acyclic organic carbonate solvent. This patent teaches that in order to maintain electrolyte liquid at −20° C., a mixing ratio of acyclic to cyclic organic carbonate must be in the range of 1 to 4. Solvent combinations outside this ratio form solids at −20° C. which is deleterious to both the capacity and cycle life of the battery.

U.S. Pat. No. 5,474,862 (3) claims the advantage of low temperature performance in lithium ion batteries employing non-aqueous electrolytes comprising a tertiary blend of a cyclic organic carbonate solvent, an acyclic organic carbonate solvent, and an acyclic ester solvent represented by the formula $RCO_2R'$. The tertiary combination of organic solvents to give battery electrolytes that perform well at low temperature appears to have been determined empirically.

Japanese Kokai application No. JP 08115742 A2 (4) discloses low temperature electrolytes for lithium ion batteries are claimed. These electrolytes consist of a lithium salt, an acyclic carbonate, and at least 10–100 vol % of chloroethylene carbonate.

SUMMARY OF THE INVENTION

In order to gain an understanding as to how non-aqueous solvents interact with each other, and with a carbonaceous, e.g., graphite, anode, in electrolytes suitable for portable power sources, we have synthesized and tested new acyclic, asymmetric alkyl carbonates, especially those with the general structural formula of $EtO—CO_2R$, where R is larger than ethyl. Our results indicate unexpectedly that increasing the carbon chain of the asymmetric alkyl ethyl carbonate causes the freezing point of the solvent, and, consequently, the electrolyte in which it is used, to decrease dramatically, thus providing the key to low temperature, high cycle life and high capacity for portable power sources. When the alkyl R group of the asymmetric solvent is larger than ethyl, a secondary solvent is useful in the electrolyte to preserve the reversible intercalation/deintercalation capacity of a graphite electrode. The asymmetric alkyl ethyl carbonate (or carbonates) then serves as the primary solvent for the non-aqueous electrolyte, i.e., the solvent providing the requisite properties, and is supplemented with the appropriate volume balance of one or more cyclic or acyclic carbonates or esters chosen for a particular application.

For lithium ion battery applications, an asymmetric alkyl methyl carbonate (or a combination of two or more asymmetric alkyl methyl carbonates) can be included in the electrolyte as the secondary solvent in a proportion of at least 10 vol %, along with a suitable lithium ion containing organic or inorganic salt. Alternativley, ethylene carbonate, or other cyclic carbonates, are useful as the secondary solvent.

The benefits of low temperature performance and high electrochemical stability are intrinsic to the chemical structure of an asymmetric alkyl ethyl carbonate solvent. In other words, different chemical functionalities, which are deliberately synthesized into the same asymmetric alkyl ethyl carbonate molecule, directly enhance the electrochemical performance of portable power sources such as batteries and capacitors. The reason for the low solvent freezing points of asymmetric organic carbonate solvents lies in the inability of asymmetric ethyl alkyl carbonate solvent molecules to properly pack which, in turn, retards the formation of crystallites at low temperatures, thereby precluding the facile transition from the liquid state to the solid state.

The preferred solvents and solvent combinations for use in the non-aqueous electrolytes of the invention are indicated below.

In one aspect, the non-aqueous electrolyte of the invention comprises an appropriate salt and a non-aqueous organic solvent comprising one or more asymmetric alkyl ethyl carbonates with the general structural formula of $EtO—CO_2R$, where R is larger than ethyl, and where R is preferably propyl, iso-propyl, butyl, iso-butyl and sec-butyl In another aspect, the one or more alkyl ethyl carbonates are the primary solvent, with the balance of the volume in secondary solvent being made up of any other (or combination of) cyclic or acyclic, symmetric or asymmetric alkyl carbonate or ester; preferably, this secondary solvent is ethylene carbonate, propylene carbonate or butylene carbonate. For use in lithium ion batteries, the secondary solvent can include preferably at least 10 vol % of one or more asymmetric alkyl methyl carbonates. The alkyl carbonates in the secondary solvent are of the form $ROCO_2R'$, where R and $R'=C_{1-4}$; the alkyl esters are of the form $RCO_2R'$, where $R=C_{0-4}$ and $R'=C_{1-4}$. For lithium ion battery applications, a lithium salt or combination of lithium salts must be included in the electrolyte formulation; examples of suitable salts include $LiBF_4$, $LiPF_6$, $(CF_3SO_2)_2NLi$ and $(CF_3SO_2)_3CLi$. For electrochemical capacitor applications, a non-lithium salt or combination of non-lithium salts must be included in the electrolyte formulation; examples of suitable salts include 1-ethyl-3-methyl imidazolium $BF_4(EMIBF_4)$, $EMIPF_6$, $(CF_3SO_2)_2NEMI$, and $(CF_3SO_2)_3CEMI$.

Other features and advantages of the invention will be apparent from the following description of the preferred embodiments thereof and from the claims, taken in conjunction with the following drawings.

DETAILED DESCRIPTION OF THE INVENTION

Figure 1A:
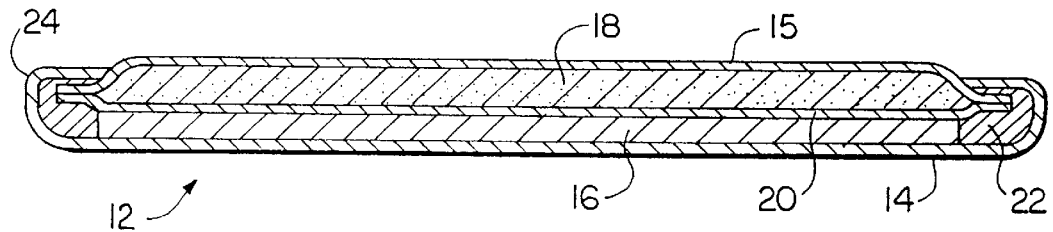
FIGS. 1a and 1b are cross-sectional views showing the structure of either a coin cell-type lithium ion battery (1a), or a coin cell-type electrochemical capacitor (1b)

An electrochemical cell or battery of the invention includes, as an electrolyte, a non-aqueous electrolyte of the invention. Referring to FIG. 1a, such a cell 12 has, within a conductive container 14 and cover 15, an anode 16 and a cathode particle mix 18. A separator 20 which includes an electrolyte is placed between the anode and the mix. Container 14 is crimped at the edges 24 capturing cover 15 under an insulating gasket 22. Cells so formed may be configured for either parallel or series operation.

Figure 1B:
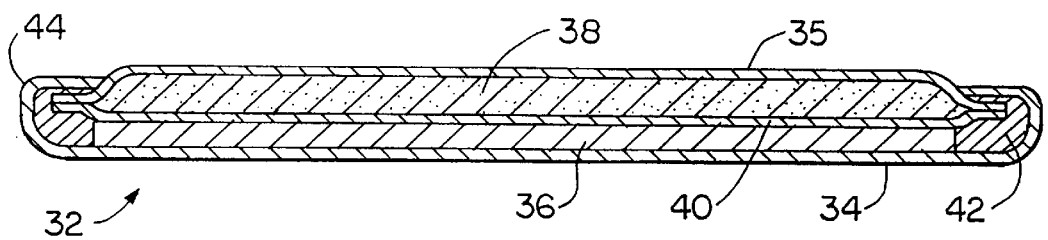

An electrochemical capacitor of the invention similarly includes a non-aqueous electrolyte of the invention and is configured as shown in FIG. 1b. An electrochemical capacitor is an electrochemical storage device in which electric charge is stored in the electrical double-layer formed at the interface between a polarizable electrode and an electrolyte solution when DC voltage is applied. Referring to FIG. 1b, such a cell 32 has, within a conductive container 34 and cover 35, two electrodes 36 and 38 which may be composed of the same material or different materials. A separator 40 which includes an electrolyte is place between the two electrodes. Container 34 is crimped at the edges 44, capturing cover 35 under an insulating gasket 42. Cells so formed may be configured for either parallel or series operation.

All of the asymmetric alkyl ethyl carbonate solvents used in the electrolyte of the invention were synthesized by the general reaction, well-known to those of skill in the art, of an alkyl chloroformate, RO—COCl, with an alkyl alcohol, R'OH, in the presence of pyridine, all dissolved in methylene chloride as shown in Equation 1:

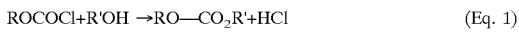

ROCOCl+R'OH →RO—CO$_2$R'+HCl     (Eq. 1)

The asymmetric alkyl carbonate products were purified by two sequential distillations under an argon atmosphere, and were found to be >99.95% pure by gas-liquid chromatography measurements. The residual water content of these asymmetric alkyl carbonates was found to be less than 20 ppm.

EXAMPLE 1

Synthesis of Ethyl isoPropyl Carbonate

Ethyl chloroformate (125 ml; 142 g; 1.31 mol) was added in a dropwise fashion over ≈2 hours to an ice cold, magnetically stirred solution of 2-propanol (100 ml; 78.5 g; 1.31 mol) and pyridine (106 ml; 104 g; 1.31 mol) in methylene chloride (1000 ml). A precipitate (pyridinium chloride) formed during the addition. The reaction mixture was stirred overnight at room temperature and then was mixed with water (500 ml). The phases were separated and the organic solution was washed successively with 5% HCl (2×250 ml), H$_2$O (2×250 ml), and saturated aqueous NaCl (250 ml). The CH$_2$Cl$_2$ solution was dried with MgSO$_4$, filtered and concentrated on a rotary evaporator without being heated above 35° C. The crude product was distilled through a Vigreux column under an inert atmosphere to provide a 136.7 g (1.03 mol; 79%) of clear, colorless liquid; bp 135°–137° C. This material was redistilled under argon to give 115.0 g (0.87 mol; 66%) of ethyl isopropyl carbonate, bp 135–136° C. IR (neat; NaCl plates) 2985, 1743 (C=O stretch), 1469, 1375, 1267, 1097, 1009, 916, 822, 793 cm$^{-1}$.

Table 1 shows various physical properties of a group of alkyl ethyl carbonates including the experimentally determined boiling and freezing points of the newly synthesized solvents.

TABLE 1

Selected physical properties of alkyl ethyl carbonate solvents.

| Solvent Formula | | MW, g/mol | f.p., ° C. | b.p., ° C. | density (a), g/cm3 | viscosity, cP |
|---|---|---|---|---|---|---|
| EtO—CO$_2$Et (DEC) | C$_5$H$_{10}$O$_3$ | (118) | −43 | 127 | 1.0650 | 0.75 (a) |
| EtO—CO$_2$Pr (EPC) | C$_6$H$_{12}$O$_3$ | (132) | −81 | 148 | 0.9502 | 0.92 (a) |
| EtO—CO$_2$iPr (EiPC) | C$_6$H$_{12}$O$_3$ | (132) | −132 | 135 | 0.9369 | 0.97 (b) |
| EtO—CO$_2$Bu (BEC) | C$_7$H$_{14}$O$_3$ | (146) | <−140 | ~165 | — | — |
| EtO—CO$_2$iBu (iBEC) | C$_7$H$_{14}$O$_3$ | (146) | <−140 | ~160 | — | — |
| EtO—CO$_2$sBu (sBEC) | C$_7$H$_{14}$O$_3$ | (146) | <−140 | ~155 | — | — |

(a) measured at 25° C.
(b) measured at 19° C.

Table 1 shows a trend towards extremely low freezing points and wide liquidus ranges for asymmetric alkyl ethyl carbonates, thereby making them attractive candidates for use in non-aqueous electrolytes for batteries and capacitors. For example, BEC, iBEC and sBEC all have freezing points that are lower than −140° C.

EXAMPLE 2

To determine an effective electrolyte composition for a lithium ion battery using asymmetric alkyl ethyl carbonates, we prepared and cycled two different asymmetric alkyl ethyl carbonate electrolytes against a graphite anode. We wanted to ascertain the ability of these new solvents to form a suitable film on the graphite surface, thereby allowing a lithium ion battery to perform with a high capacity and long cycle life. The two electrolytes were ethyl propyl carbonate (EPC) and ethyl iospropyl carbonate (EiPC), all 1M in LiPF$_6$.

Figure 2A:
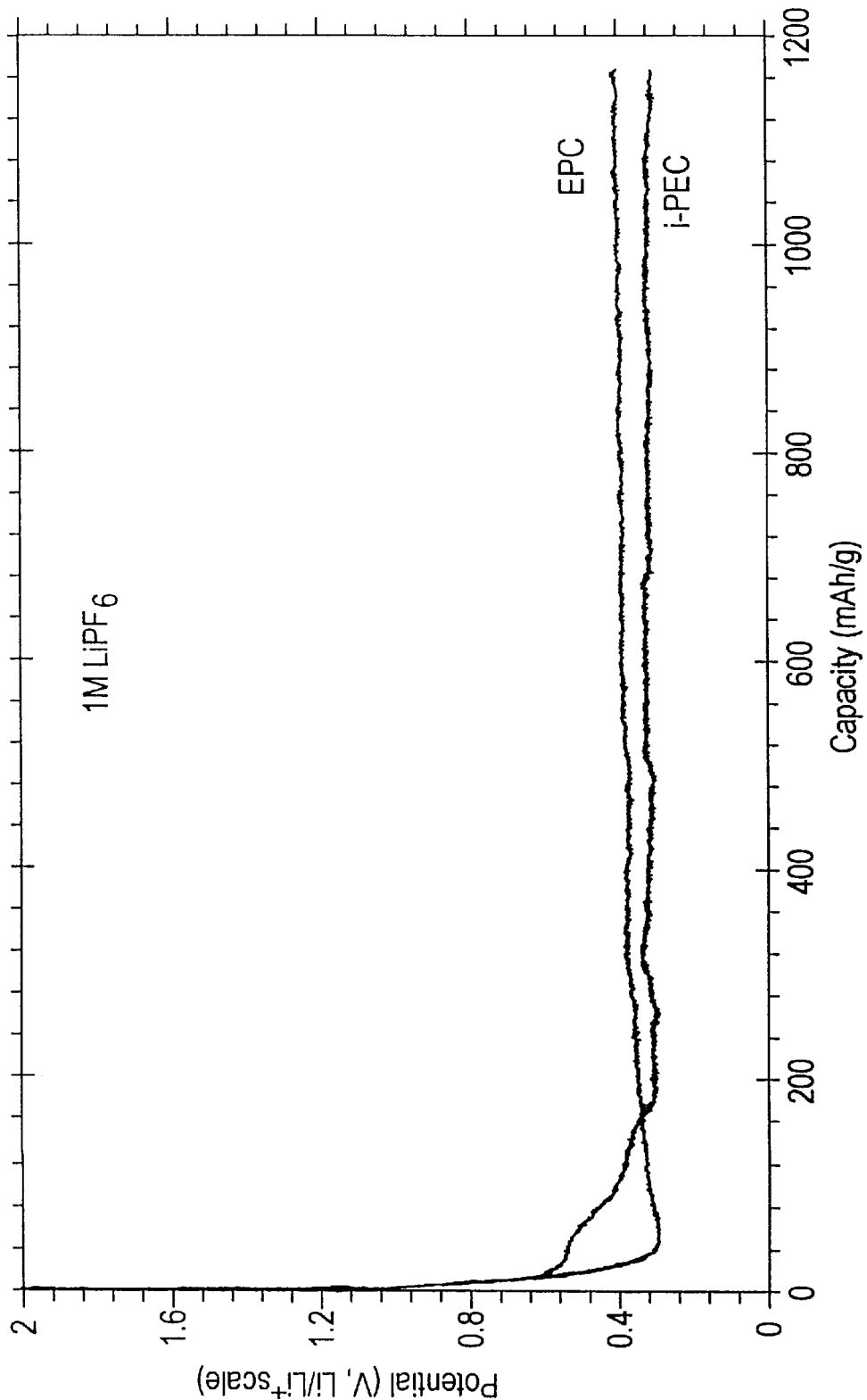
FIGS. 2a and 2b are graphs of voltage vs. the Li+ ion intercalation capacity of a graphite anode showing to compare the performance of asymmetric alkyl ethyl carbonates in the absence (FIG. 2a) and presence (FIG. 2b) of alkyl methyl carbonates, each 1M in LiPF$_6$.
Figure 2B:
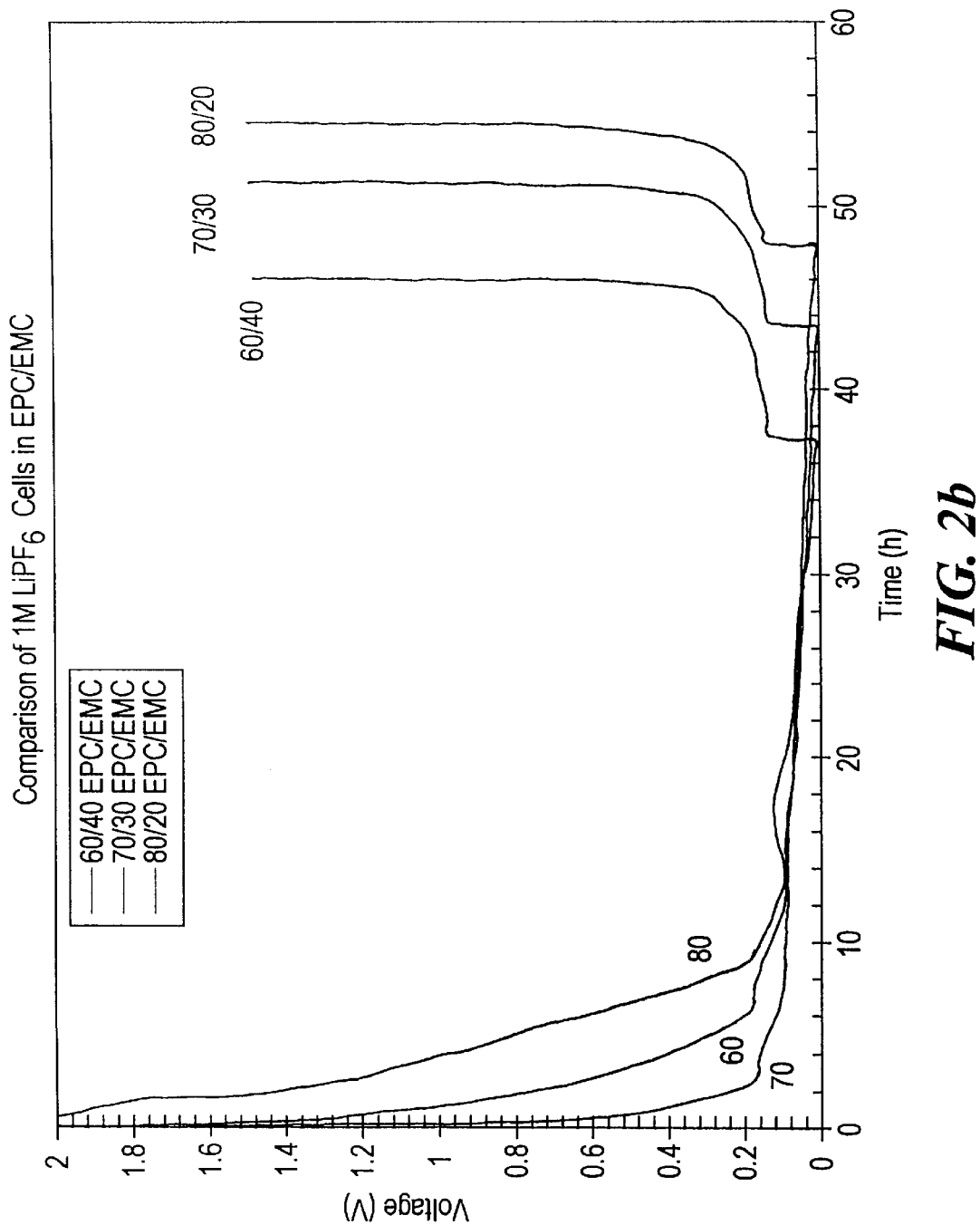

FIG. 2a presents the potential (V) vs. capacity (mAh/g) and the cycle life behavior [capacity (x in LixC$_6$ vs. cycle number] of graphite electrodes cycled against a Li metal counter electrode in the indicated solvent electrolytes. All of the cells were cycled between the potential limits of 1.50 and 0.001 V vs. Li+/Li at a current density of from 100 to 200 μA/cm$^2$. This corresponds to a charge/discharge rate of ~C/20. The results shown in FIG. 2a demonstrate that electrolytes consisting of the alkyl ethyl carbonate solvents EPC and EiPC, when tested as above, could not be cycled at all against a graphite electrode. However, referring to FIG. 2b, the addition of increasing proportions of EMC to an EPC electrolyte, 1M in LiPF$_6$, caused cycling capacity to appear and then increase. Specifically, as seen in FIG. 2b, as the ratio of EMC to EPC is increased from 1:4 to 2:3, the corresponding reversible capacity between 0.2 and 0.4 volts effectively doubles. Moreover, the irreversible capacity that accompanies the first intercalation process is dramatically reduced as the amount of alkyl methyl carbonate (e.g., EMC) is increased. This trend demonstrates that a secondary solvent, particularly an alkyl methyl carbonate, could be necessary in order to maintain a stable solid electrolyte interface (SEI) on the graphite anode of a lithium ion battery.

In the example above, EPC was used at a vol % ranging from 60–80 vol %. In other embodiments, in particular with EC, PC or BC as the secondary solvent, a significantly smaller vol % of the alkyl ethyl carbonate, for example less than 25%, can be used. It is also contemplated that the proportion of an asymmetric alkyl ethyl carbonate in a high power cell electrolyte can usefully range from 10–90 vol. %.

EXAMPLE 3

Figure 3:
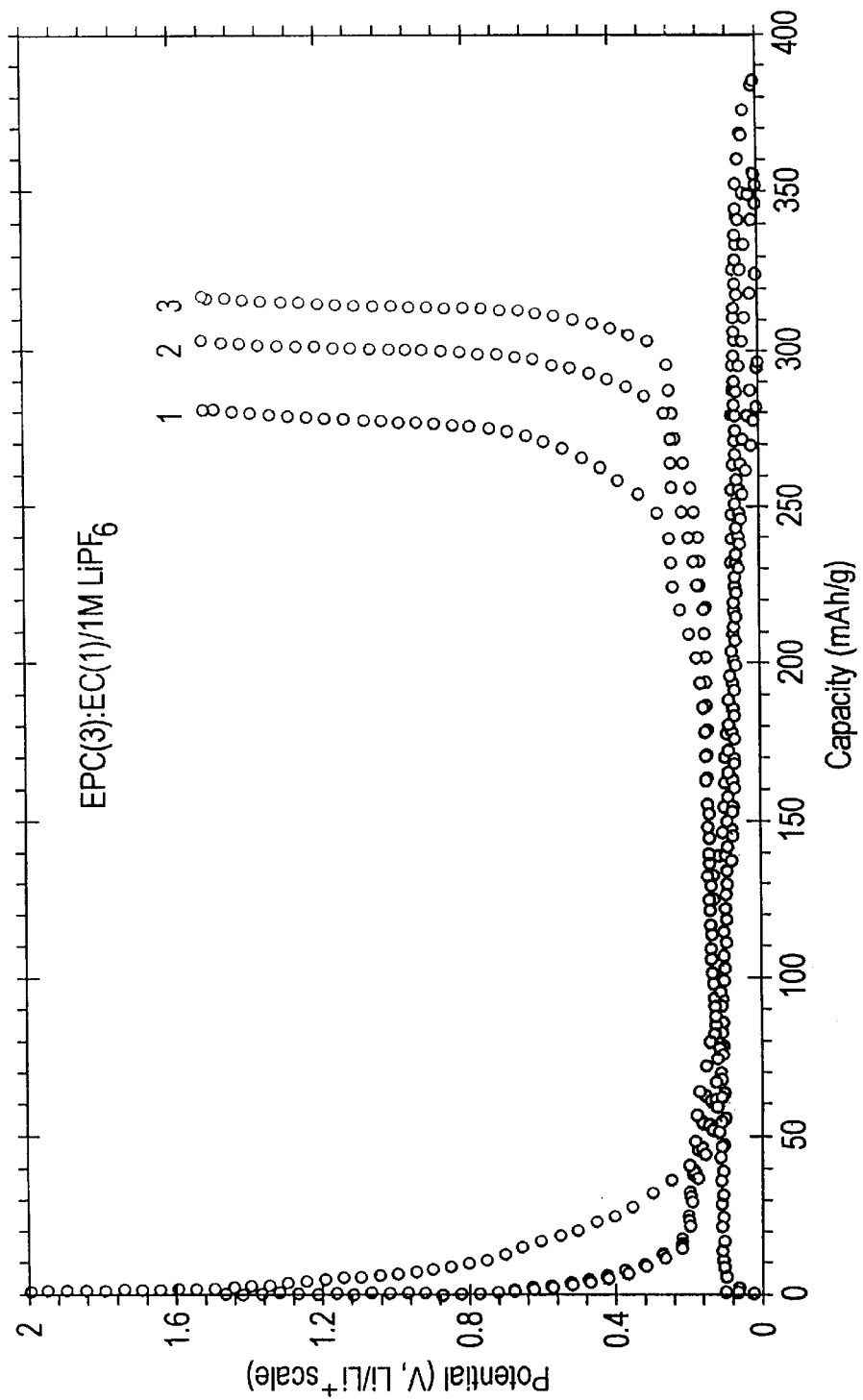
FIG. 3 shows the potential vs. lithium ion intercalation capacity of a graphite electrode in EPC(3):EC(1).

In additional experiments to determine an effective electrolyte composition for a lithium ion battery using asymmetric alkyl ethyl carbonates, we added EC as a co-solvent to EPC and EiPC, in quantities up to 25%, v/v, and observed the changes in the electrochemical behavior of the graphite electrodes. As can be seen in FIG. 3, graphite electrodes can be cycled (intercalation/deintercalation of Li-ions) successfully in EPC solution containing 25 vol % EC and 1M $LiPF_6$. FIG. 3 shows the first three cycles, expressed as potential (V, $Li/Li^+$ couple) vs. capacity (mAh/g), of a graphite electrode cycled vs. a Li metal counter electrode in EPC(3):EC(1)/1M $LiPF_6$ in potential limits of 1.5–0.001 V (vs. $Li/Li^+$ couple) at a current density of 100 $\mu A/cm^2$.

From the results illustrated in the Examples, it is clear that asymmetric alkyl ethyl carbonate solvent electrolytes as disclosed herein are extremely valuable for low temperature commercial applications, particularly when used in specified combinations with other alkyl carbonate or alkyl ester solvents. The electrolytes of the invention provide excellent capacity and cycle life, e.g., against graphite electrodes in lithium ion battery applications, having such a wide liquidus range. In other applications, any other carbonaceous or amorphous metal oxide anode could be used.

It is understood that various other modifications will be apparent to and can readily be made by those skilled in the art without departing from the scope and spirit of this invention. Accordingly, it is not intended that the claims appended herein be limited to description as set forth herein, but rather that the claims be construed as encompassing all of the features of patentable novelty including all features that would be treated as equivalent thereof by those skilled in the art to which this invention pertains.

REFERENCES

1. H. J. Gores and J. M. G. Barthel, Pure & Appl. Chem, 67, 919 (1995).
2. H. Okana, et al., U.S. Pat. No. 5,525,433, Jun. 11, 1996.
3. H. Okuno, et al., U.S. Pat. No. 5,474,862, Dec. 12, 1995.
4. Y. Shoji, et al., Jpn. Kokai Tokkyo Koho JP 08115742 A2 7, May 1996.
5. L. A. Dominey in "Lithium Batteries", G. Pistoia, ed., Elsevier, New York, 1994, p. 160.

What is claimed is:

1. A non-aqueous organic solvent, said non-aqueous organic solvent comprising one or more asymmetric alkyl ethyl carbonates of the form $EtO-CO_2R$, where R is an alkyl group having four or more carbon atoms.

2. The non-aqueous organic solvent of claim 1, wherein R in said asymmetric alkyl ethyl carbonate is selected from the group consisting of butyl, iso-butyl and sec-butyl.

3. A non-aqueous electrolyte comprising a salt; and a non-aqueous organic solvent, said non-aqueous organic solvent comprising one or more asymmetric alkyl ethyl carbonates of the form $EtO-CO_2R$, where R is an alkyl group having three or more carbon atoms.

4. An electrochemical cell comprising an anode;

a cathode; and an electrolyte, wherein said electrolyte is the non-aqueous electrolyte of claim 3 and wherein the salt in said electrolyte is a lithium salt.

5. The non-aqueous electrolyte of claim 3, wherein R in said asymmetric alkyl ethyl carbonate is selected from the group consisting of butyl, iso-butyl and sec-butyl.

6. A non-aqueous electrolyte comprising a salt; and a non-aqueous organic solvent, said non-aqueous organic solvent comprising a solvent mixture of one or more asymmetric alkyl ethyl carbonates for use as a primary solvent, each said primary solvent asymmetric alkyl ethyl carbonate being of the form $EtO-CO_2R$, where R is an alkyl group having three or more carbon atoms, said solvent mixture further comprising at least one kind of alkyl carbonate or alkyl ester as a secondary solvent, said secondary solvent alkyl carbonate being selected from the group consisting of cyclic, acyclic, linear, branched, symmetric and asymmetric alkyl carbonates of the form $ROCO_2R'$, where R and $R'=C_{1-4}$, said secondary solvent alkyl ester being selected from the group consisting of cyclic, acyclic, linear, branched, symmetric and asymmetric alkyl esters of the form $RCO_2R'$, where $R=C_{0-4}$, and $R'=C_{1-4}$.

7. The non-aqueous electrolyte of claim 3 or claim 6, wherein said salt is a lithium salt.

8. The non-aqueous electrolyte of claim 7, wherein said salt is selected from the group consisting of $LiBF_4$, $LiPF_6$, $(CF_3SO_2)_2NLi$ and $(CF_3SO_2)_3CLi$.

9. The non-aqueous electrolyte of claim 3 or claim 6, wherein said salt is a non-lithium salt.

10. The non-aqueous electrolyte of claim 9, wherein said salt is selected from the group consisting of $EMIBF_4$, $EMIPF_6$, $(CF_3SO_2)_2NEMI$ and $(CF_3SO_2)_3CEMI$.

11. The non-aqueous electrolyte of claim 6, wherein R in said primary solvent asymmetric alkyl ethyl carbonate is selected from the group consisting of butyl, iso-butyl and sec-butyl.

12. The non-aqueous electrolyte of claim 6, wherein said secondary solvent is at least one kind of cyclic alkyl carbonate selected from the group consisting of ethylene carbonate, propylene carbonate and butylene carbonate.

13. An electrochemical cell comprising an anode;

a cathode; and an electrolyte, wherein said electrolyte is the non-aqueous electrolyte of claim 6, said non-aqueous electrolyte comprising a lithium salt.

14. A capacitor comprising a first electrode;

a second electrode; and an electrolyte, said electrolyte comprising the non-aqueous electrolyte of claim 3 or claim 6, wherein the salt in said electrolyte is a non-lithium salt.

* * * * *